(12) United States Patent
Deb

(10) Patent No.: US 12,282,996 B2
(45) Date of Patent: Apr. 22, 2025

(54) MACHINE LEARNING-BASED MODELING OF UNIQUE CONTROLLABLE HEADS

(71) Applicant: Debayan Deb, Okemos, MI (US)

(72) Inventor: Debayan Deb, Okemos, MI (US)

(*) Notice: Subject to any disclaimer, the term of this patent is extended or adjusted under 35 U.S.C. 154(b) by 239 days.

(21) Appl. No.: 18/095,897

(22) Filed: Jan. 11, 2023

(65) Prior Publication Data

US 2024/0233256 A1 Jul. 11, 2024

(51) Int. Cl.
  *G06T 17/00* (2006.01)
  *G06F 16/27* (2019.01)
  *G06T 15/04* (2011.01)
  *G06T 19/20* (2011.01)

(52) U.S. Cl.
  CPC .............. *G06T 17/00* (2013.01); *G06F 16/27* (2019.01); *G06T 15/04* (2013.01); *G06T 19/20* (2013.01); *G06T 2219/2012* (2013.01)

(58) Field of Classification Search
  CPC ......... G06T 17/00; G06T 15/04; G06T 19/20; G06T 2219/2012; G06F 16/27
  See application file for complete search history.

(56) References Cited

U.S. PATENT DOCUMENTS

2021/0089759 A1* 3/2021 Todorov ............... G06V 40/174
2021/0104086 A1* 4/2021 Wang .................... G06N 3/045

FOREIGN PATENT DOCUMENTS

CN 104737152 A * 6/2015 ......... G06Q 30/0201
KR 20200012355 A * 2/2020 ......... G06K 9/00221

OTHER PUBLICATIONS

English translation of CN 104737152 A (Year: 2015).*
English translation of KR 20200012355 A (Year: 2020).*

* cited by examiner

*Primary Examiner* — Grace Q Li
(74) *Attorney, Agent, or Firm* — The Rapacke Law Group, P.A.; Andrew Rapacke

(57) ABSTRACT

A system for an intelligent machine learning (ML)-based system for 3-D modeling of unique controllable heads. The system includes a processor of a modeling server connected to a user's data node over a network and a memory on which are stored machine-readable instructions that when executed by the processor, cause the processor to: receive user-desired input data related to modeling of a controllable 3-D head from the user's data node; parse the user-desired input data to derive a feature vector including 3-D head modeling parameters; retrieve from a local database previous user-desired inputs to fine-tune the feature vector; provide the fine-tuned feature vector to a machine learning (ML) module configured to generate the controllable 3-D head model; receive the 3-D head model from the ML module; and render the controllable 3-D head model to the user's data node.

14 Claims, 8 Drawing Sheets

MACHINE LEARNING-BASED MODELING OF UNIQUE CONTROLLABLE HEADS

FIELD OF DISCLOSURE

The present disclosure generally relates to 3-D modeling and more particularly, to an intelligent machine learning (ML)-based and artificial intelligence (AI)-enhanced automated system for 3-D modeling of unique controllable heads.

BACKGROUND

Viewers enjoy watching movies or playing games with high-quality 3-D effects involving technologies like VFX and CGI. The realism in the characters make viewers wonder how such character in the movie is framed to make it look so real. It may be very intriguing to user how game avatars and characters can take the frame of a real person who is playing the game. What would be more interesting if one could render his or her own doppelganger which looks just like them and attend online meetings.

What user may not realize is that it takes hours to synthesize or model such 3-D characters by graphics designers. With increasing demand for realism in the industry, the job is becoming even harder. To make the life of a 3-D artist easier, the researchers in the domain of 3-D graphics and computer vision focused their thoughts on generating high resolution geometry and visually realistic textures. Recent works are directed towards making their outputs as close to real person as possible. This work is remarkable and opens opportunities to render hyper-realistic face models. However, the existing solutions lack in meeting artistic use-cases. Artists may want maximum control over generated geometry and corresponding texture of human heads. They may require to edit both head geometry and textures after their generation from the automated linear or non-linear methods.

While current solutions took attempt to semantically control physical and demographic attributes, the methods lack in presenting a consolidated network design. One architecture should have both disentangled and entangled features as required by artists. For example, demographic attributes like age, race, and gender when provided as input should output entangled geometry and texture since a person from a particular ethnicity may have distinct physical face shape and texture color. Whereas, within texture color, there may be a range of color interpolation, like for a mixed-race person, the texture color can vary between light to dark skin tone, with corresponding change in color in eyebrows and lips. Thus, an option to control color of the output texture map provides flexibility to artists to interpolate facial features within a particular demographic cohort.

Besides realism and control over generated meshes, it is imperative that the generated geometry is highly diverse among all generated samples with in a particular demographic cohort so that the artist has the flexibility to choose from several options according to the application. Novelty is also an important measure to quantify whether the generated samples are different from the available training set. Otherwise, with low novelty, an artist can just choose from the real data. Conventional solutions do not provide for a hybrid and flexible model favorable for artists for creation of their 3-D assets with maximum diversity, novelty, correlation, realism (i.e., high resolution), and control.

Accordingly, a machine learning (ML)-based and artificial intelligence (AI)-enhanced automated system for modeling of unique controllable heads is desired.

Brief Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for intelligent machine learning (ML)-based and artificial intelligence (AI)-enhanced automated system for 3-D modeling of unique controllable heads. The system includes a processor of a modeling server connected to a user's data node over a network and a memory on which are stored machine-readable instructions that when executed by the processor, cause the processor to: receive user-desired input data related to modeling of a controllable 3-D head from the user's data node; parse the user-desired input data to derive a feature vector including 3-D head modeling parameters; retrieve from a local database previous user-desired inputs to fine-tune the feature vector; provide the fine-tuned feature vector to a machine learning (ML) module configured to generate the controllable 3-D head model; receive the 3-D head model from the ML module; and render the controllable 3-D head model to the user's data node.

Another embodiment of the present disclosure provides a method that includes one or more of: receiving user-desired input data related to modeling of a controllable 3-D head from the user's data node; parsing the user-desired input data to derive a feature vector including 3-D head modeling parameters; retrieving from a local database previous user-desired inputs to fine-tune the feature vector; providing the fine-tuned feature vector to a machine learning (ML) module configured to generate the controllable 3-D head model; receiving the controllable 3-D head model from the ML module; and rendering the controllable 3-D head model to the user's data node.

Another embodiment of the present disclosure provides a non-transitory computer readable medium comprising instructions, that when read by a processing component, cause the processing component to perform: receiving user-desired input data related to modeling of a controllable 3-D head from the user's data node; parsing the user-desired input data to derive a feature vector including 3-D head modeling parameters; retrieving from a local database previous user-desired inputs to fine-tune the feature vector; providing the fine-tuned feature vector to a machine learning (ML) module configured to generate the controllable 3-D head model; receiving the controllable 3-D head model from the ML module; and rendering the controllable 3-D head model to the user's data node.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
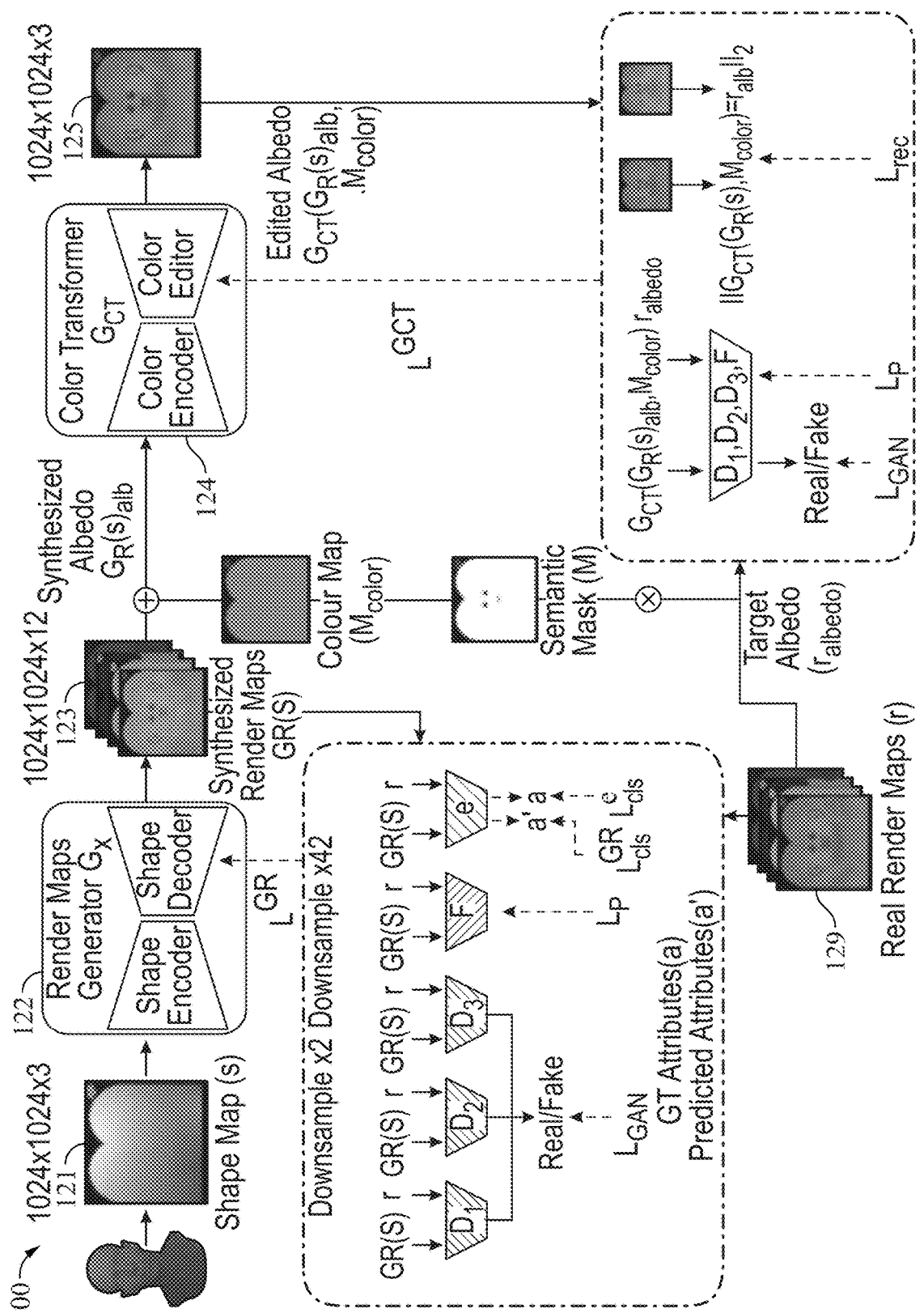
FIG. 1 illustrates an overview of 3-D model training framework consistent with the disclosed embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of processing job applicants, embodiments of the present disclosure are not limited to use only in this context.

The present disclosure provides a system and method for an automated AI/ML-based 3-D modeling of unique controllable heads. As discussed above, for assisting game artists, the automated generation of 3-D assets has been an intriguing and challenging task for computer vision researchers. Popular linear and nonlinear methods synthesize realistic characters but with limited control over the diversity and quality of rendered outputs and suffer from limited correlation between shape and texture of the character. The disclosed embodiments propose a combined PCA and VAE-based approach which offers quality, diversity, control, and realism along with explainable network design, all desirable features to artists in the domain. First, PCA-based Shape Generator is fitted on meshes to identify latent directions and generate more samples. The generated samples are converted to shape maps which then act as the training set for the Render Map Generator—an image translation network thus introducing non-linearity to our approach. The Render Map Generator learns multiple UV maps along with Albedo. Together these maps help in bringing realism to the rendered 3-D model. In one embodiment, a novel Color Transformer Model that maps the generated texture to the user-given color pallet is implemented. The Color Transformer Model allows for semantic color control over generated maps. To test the diversity and novelty of the generated meshes, a quantifiable metric called Uniqueness and Novelty and a combined metric to test the overall performance of our model are implemented.

In one embodiment of the present disclosure, the system and method provide for automated generation of high-quality 3-D heads with a high degree of user controllability at every step of the synthesis process. The proposed method employs three sequential modules: (1) Geometry Generator ($\mathcal{G}_{Geom}$), (2) Render Maps Generator ($\mathcal{G}_R$) and (3) Color Transformer ($\mathcal{G}_{CT}$), where each generator module is conditioned based on outputs of the previous one.

According to the disclosed embodiments, Geometry or Shape Generator is implemented as follows. Note that "geometry" and "shape" are used interchangeably herein. Mesh geometry 1 is defined by dataset as S={V, F} where $V \in \mathbb{R}^{n \times 3}$ is a set of n vertices in x, y, z plane, and $F \in \mathbb{R}^{T \times 3}$ are its faces represented by triangular polygon. The meshes are registered to a common topology so U and F are consistent across entire dataset and only the vertices V vary in the 3-D plane giving the mesh its shape and identity. These vertices have pointwise correspondence with other meshes in the dataset.

Following dataset registration, each mesh is annotated according to categories such as race, age, and gender. Then, mean mesh $\vec{S}_{mean}$ is calculated from the training set. Then, a Principal Component Analysis (PCA) is applied over the complete training set and the components (Eigen vectors) are calculated to produce the most variations sorted by their Eigen values. The offset values are calculated for artist-given controls like age, gender and race. For example, say the artist gives the values for race as "Asian", gender as "male", and age as "old". Then, mathematically system calculates:

$$\Delta c_{(g,a,r)} = \frac{1}{|S_{(g,a,r)}|} * \sum_i (S^i_{(g,a,r)} - \overline{S}_{mean}) \quad (1)$$

Here, $\Delta c_{(g,a,r)}$ is the offset that makes the instance correspond to specific input controls g gender, a age, and r race provided by the artist/user, $S_{(g,a,r)}^i$ is the $i^{ith}$ geometry or mesh in the training set that fall into the category of g, a, and r, and $|S_{(g,a,r)}|$ represents the cardinality or the number of meshes in the set $S_{(g,a,r)}$.

After offset calculation, the new meshes are generated from PCA using the first $|\vec{\beta}|$ principal components. The amount of variance represented by each principal component $\vec{\beta} \in \mathbb{R}^{3n \times |\vec{\beta}|}$ is given by the coefficients of $\vec{\alpha} \in \mathbb{R}^{1 \times |\vec{\beta}|}$. To generate new meshes or geometry, coefficient $\vec{\alpha}$ is multiplied by a random normal in the same dimension to generate new coefficients. Mathematically, the linear model for geometry can be defined as:

$$w_i = \mathcal{N}(\mu, \sigma^2, i) \times \vec{\alpha}_i \quad (2)$$

$$Geom_{new} = \overline{S}_{mean} + \sum_{i=1}^{|\beta|} w_i \beta_i \quad (3)$$

where Wi is the weight coefficient bringing variation in the principal directions defining the training set, μ and σ are 0 and 1 for the normal distribution N, for drawing ith principal component.

The generated mesh sample from PCA is then linearly displaced by $\Delta c(g,a,r)$ to produce artist-desired mesh with specific age, race, and gender.

$$\hat{Geom}_{(g,a,r)} = Geom_{new} + \Delta c_{(g,a,r)} \quad (4)$$

From PCA, we get the diversified set of meshes with high fidelity. The generated set, represented by $\hat{Geom}_{(g,a,r)}$ is then converted into shape maps also called as position maps. Shape maps are the representation of 3-D geometry in 2-D plane. They are formed by interpolating the 3-D vertices V as r, g, b values and plotting their values in UV plane at the coordinates described by the texture coordinates T in the geometry. The complete process is described in.

According to one disclosed embodiment, Render Maps Generator module is implemented as follows. A new approach that allows for high correlation between render maps and geometry along with scope for easy editing is proposed. Very tight coupling between shape and texture can be achieved if texture synthesis method is directly conditioned on a given shape instance (instead of being conditioned on a random latent code). For this, a way to represent shape information in a given mesh is needed. First, the modeling system may cylindrically unwrap the mean mesh $\overline{S}_{mean}$ in a specific mesh topology and may align all meshes in the 3-D space via General Procrustes Analysis (GPA). Usually, the UV space is reserved for RGB texture values. Instead, the disclosed modeling system stores 3-D coordinates for each vertex (x, y, z) and the normal orientations ($n_x$, $n_y$, $N_z$) in the UV space at each respective UV pixel coordinate. Finally, the modeling system may compute barycentric coordinates of each pixel and may interpolate to obtain a dense UV map, denoted by Shape Map (see FIG. 1 discussed below).

FIG. 1 illustrates an overview of the 3-D model training framework 100 consistent with the disclosed embodiments. The system first cylindrically unwraps shape information and perform barycentric interpolation to obtain dense shape maps 121. Then, the Render Maps Generator 122 takes shape maps 121 as inputs and outputs as 12-channel render map image 123 containing Albedo, normal, gloss, and spec.

reflection. Further, a color transformer module 124 allows users to easily change hues of certain semantic regions of the final texture such as skin, lips, eyebrows, and tongue colors to produce edited Albedo 125.

The Render Map Generator 122 takes an input shape map image (e.g., 121), $s \in \mathbb{R}^{H \times W \times C}$, and outputs an $(N_d \times C_d)$-channel image, $\mathcal{G}_R(s)$, where $N_d$ are the number is the number of required render maps and $C_d$ is their respective channel-dimensionality. As the generator is conditioned only on the input shape map s, for a given head shape, the output render maps should be highly correlated with the head geometry. The disclosed embodiments employ four render maps, namely, albedo, normal, gloss, and specular reflection with 3 channels each. Therefore, the output of Render Map Generator 122 is a 12-channel image (e.g., 123).

A major requirement of any 3-D head synthesis method that attempts to aid artists in character design is high perceptual (i.e., visual) realism of the generated 3-D heads. To achieve this, the modeling system may employ multiple discriminators that have identical network structure operating at different scales—i.e., multi-scale discriminators. Specifically, the system may employ 3 discriminators ($D_1^{G_R}$, $D_2^{G_R}$, $D_3^{G_R}$) and may down sample the real and synthesized high-resolution images by a factor of 2 and 4 and train the generator via commonly employed adversarial GAN loss ($\mathcal{L}_{GAN}^{G_R}$).

To further improve realism, the modeling system may incorporate a feature matching loss ($\mathcal{L}_{FM}^{G_R}$) the discriminator and a perceptual loss ($\mathcal{L}_P^{G_R}$) via a pre-trained Convolutional Neural Network (CNN) as is common in image-to-image translation works.

The above discussed losses may encourage the synthesized render maps to come close to the real distribution. However, the method may also ensure that the synthesized render maps follow the demographic attributes ($\alpha$) desired by the user. The system may one-hot encode the attributes for the 3 demographic groups {Gender, Age, Race} such that each attribute is denoted as 1/0 for with/without it. The ground truth attributes include 2 genders, 3 age groups, and 4 races. For non-limiting example, one-hot encoding of a female that is young and Caucasian will be ba=[0, 1, 1, 0, 0, 0, 1, 0, 0] for 9 possible attributes in the order of {male, female, young, middle, old, Asian, Caucasian, African-American, mixed}. The input shape maps may contain sufficient demographic information such that $G_R$ usually outputs appropriate render maps belonging to the user-chosen cohort and do not require explicit user inputs.

However, in order to further constrain this criterion, an attribute classifier C may be used to encourage the synthesized render maps to correctly own the desired demographic attributes, i.e. C(r)→a. The attribute classifier is a CNN that is trained via classification loss as:

$$\mathcal{L}_{cls}^C = \mathbb{E}_{(r,a)}[-\log(C(a|r))]$$

while the generator attempts to output render maps belonging to the correct demographic group via $$\mathcal{L}_{cls}^{G_R} = \mathbb{E}_{(s,a)}[-\log(C(a|\mathcal{G}_R(s)))]$$

As discussed above, a major shortcoming in prior 3-D head synthesis methods is their inability to edit the Albedo map in a manner where users can easily obtain textures with semantic coloring of their choosing. For instance, if an artist prefers a certain texture synthesized by a GAN, prior solutions are not robust enough to allow control over skin tone editing after the first stage of synthesis. Consequently, artist spends significant efforts to manipulate the Albedo map. To improve upon this lack of basic control over texture color, the proposed method utilizes a Color Transformer module 124 that allows for changing the skin tone, color of the eye brows, lip and tongue color to any shade as picked by the artist and, therefore, provides for an unprecedented amount of diversity and flexibility in the final synthesized Albedo maps.

Similar to the Render Maps Generator 122, the system 100 may model the problem of editing colors in a synthesized Albedo map as an image-to-image translation task. That is, the system may obtain a function, say $\mathcal{G}_{CT}$, that takes a synthesized texture ($\mathcal{G}_R(s)$) and a user-desired color palette ($\mathcal{M}_C$) as inputs and outputs an edited Albedo map $\mathcal{G}_{CT}(\mathcal{G}_R(s)_{albedo}, \mathcal{M}_C)$ that has: (a) the same identity content as $\mathcal{G}_R(s)$, and (b) semantic coloring (such as lip, eyebrows, tongue, and skin colors) from $\mathcal{M}_C$.

Controllability may be addressed as following. We first an easy way is needed to encode the user-desired semantic color information which can then be translated by the Color Transformer module 124. A straightforward method would be to either trivially provide one-hot encoding attributes such as "dark hair" or "brown skin" as input to the network, or take an RGB vector denoting exact color values desired by the end-user. However, this makes learning $\mathcal{G}_{CT}$ difficult as the network may not have any spatial cues as to which pixels in the Albedo maps requires editing. To this end, the disclosed embodiment may use a Semantic Coloring Map ($\mathcal{M}_C$) where users can simply change the desired color in semantic regions of the face.

Note that meshes may fall under a common topology that follows the same UV space. This fact may be exploited to, first, manually build a semantic segmentation mask where the system may trace over Albedo maps output by $\mathcal{G}_R$ and may assign class labels to pixel regions falling under semantic regions. Specifically, the system may mark the lips, eyebrows, skin, and tongue. Then, the system may use the mask to compute the median colors in all training examples to get final Semantic Coloring Mask for each training instance 2.

Color Transfer may be implemented as follows. A way to enforce the $\mathcal{G}_{CT}$ network to learn the semantic color transfer from a source Albedo map to a desired color map. If we only the source Albedo map is inputted with its own corresponding color map, $\mathcal{G}_{CT}$ will fail to inherit any color transferability as there is no new information. Hence, a random target shuffling strategy for training $\mathcal{G}_{CT}$ may be used. Given a mini-batch containing a set of corresponding Albedo and Semantic Coloring Mask pairs, $\{(\mathcal{G}_R(s)_{albedo_i}, \mathcal{M}_{C_i})\}$ the system create may random training tuplets $\{(\mathcal{G}_R(s)_{albedo_i}, \mathcal{M}_{C_j}, \mathcal{G}_R(s)_{albedo_j})\}$, where j may or may not be equal to i. The $\mathcal{G}_R(s)_{albedo_i}, \mathcal{M}_{C_j}, \mathcal{G}_R(s)_{albedo_j}$ are denoted as the source Albedo map, target color map, and target Albedo map, respectively.

The system may use reconstruction loss to encourage Ser to transfer colors from source to target.

$$\mathcal{L}_{cls}^{\mathcal{G}_{CT}} = \left\| \mathcal{G}_{CT}\left(\mathcal{G}_R(s)_{albedo_j}, \mathcal{M}_{C_j}\right) - \mathcal{G}_R(s)_{albedo_j} \right\|_2$$

Note that the $\mathcal{G}_{CT}$ does not have access to any identity-related features of the target Albedo since the input to the network is the source Albedo map and semantic colors of the target Albedo 129. Due to this, the network only learns to transfer the color information present in the source Albedo rather than any content-related features. Also, a weaker constraint of allowing j=i (source and target Albedos are the same) leads to better convergence as long as the probability of this happening is kept low by introducing a larger batch size.

Visual Quality is implemented as following. To maintain the visual quality of the synthesized results after semantic color transfer, the same losses may be introduced as in previous step ($\mathcal{G}_R$). That is, encouraging visual realism to synthesized outputs by employing (i) adversarial loss via multi-scale discriminators $\mathcal{L}_{GAN}^{G_{CT}}$, (ii) feature-matching loss $\mathcal{L}_{FM}^{G_{CT}}$ and (iii) perceptual loss $\mathcal{L}_P^{G_{CT}}$.

Training framework may be implemented as follows.

The user-controllable, diverse, and high-quality 3-D head synthesis modeling may be trained in a sequential manner in 2-stages (see FIG. 1). First, the Render Maps Generator 122 may be trained with the following objectives:

$$\min_{\mathcal{G}_R} \mathcal{L}_{\mathcal{G}_R} = \mathcal{L}_{GAN}^{\mathcal{G}_R} + \lambda_f \left( \cdot \mathcal{L}_P^{\mathcal{G}_R} + \cdot \mathcal{L}_{FM}^{\mathcal{G}_R} \right) + \lambda_{cls} \cdot \mathcal{L}_{cls}^{\mathcal{G}_R},$$

$$\min_{\mathcal{D}^{\mathcal{G}_R}} \mathcal{L}_{\mathcal{D}^{\mathcal{G}_R}} = -\mathcal{L}_{GAN}^{\mathcal{G}_R},$$

$$\min_C \mathcal{L}_C = \mathcal{L}_{cls}^C.$$

After the Render Maps Generator 122 is trained to output visually realistic and plausible render maps from input shape maps, then the $\mathcal{G}_{CT}$ may be trained with the following aim:

$$\min_{\mathcal{G}_{CT}} \mathcal{L}_{\mathcal{G}_{CT}} = \mathcal{L}_{GAN}^{\mathcal{G}_{CT}} + \lambda_{rec} \cdot \mathcal{L}_{rec} + \lambda_f \left( \cdot \mathcal{L}_P^{\mathcal{G}_{CT}} + \mathcal{L}_{FM}^{\mathcal{G}_{CT}} \right),$$

$$\min_{\mathcal{D}^{\mathcal{G}_{CT}}} \mathcal{L}_{\mathcal{D}^{\mathcal{G}_{CT}}} = -\mathcal{L}_{GAN}^{\mathcal{G}_{CT}}.$$

Figure 1A:
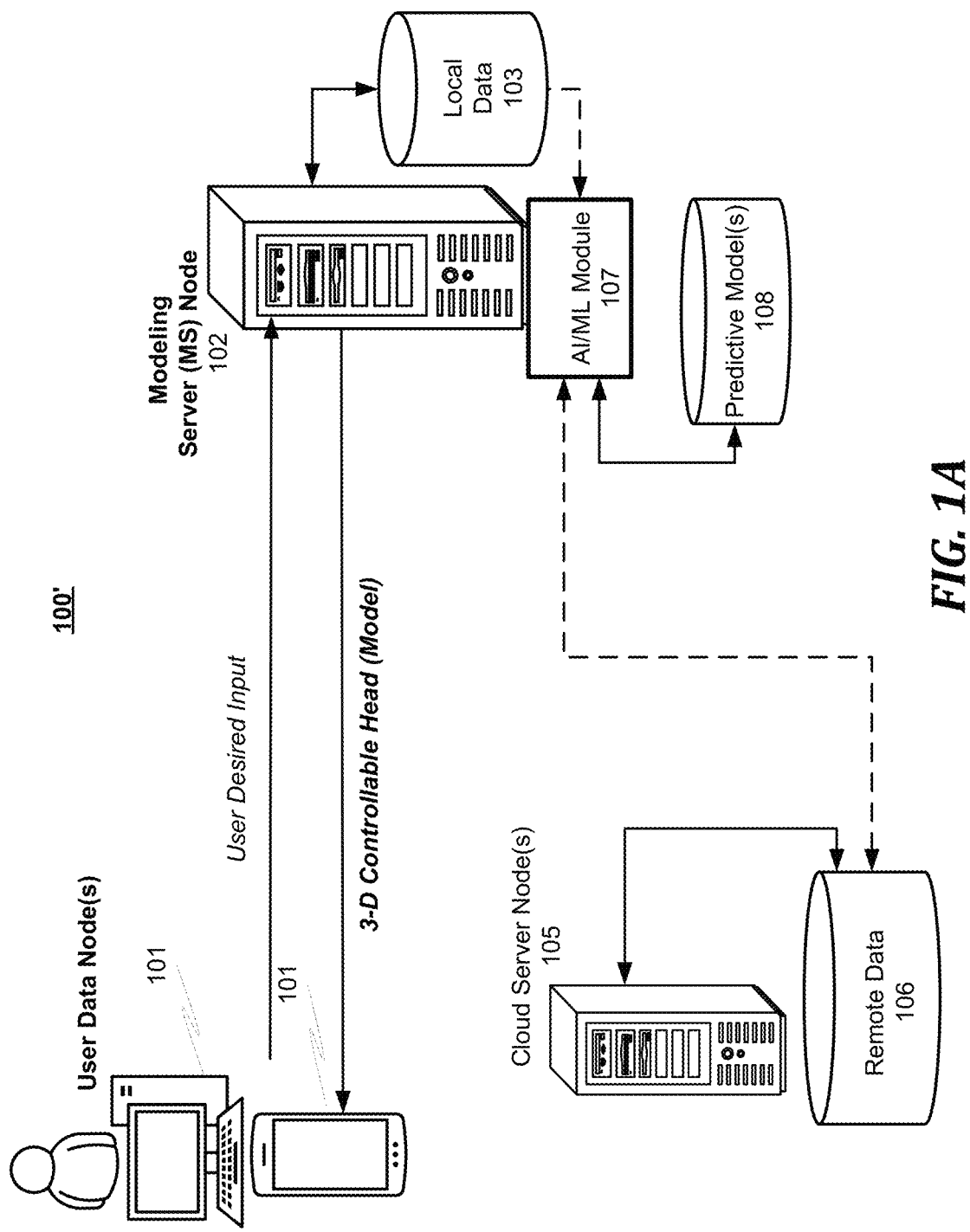
FIG. 1A illustrates a network diagram of an automated system for an AI/ML-based 3-D modeling of unique controllable heads consistent with the present disclosure.

FIG. 1A illustrates a network diagram 100' of an automated system for an AI/ML-based 3-D modeling of unique controllable heads consistent with the present disclosure.

A modeling server (MS) node 102 may receive user desired input from a user device 101. The MS node 102 may provide the user desired input data to the AI/ML module 107 that may generate predictive model(s) 108 that may provide controllable heads based on the user desired data. The AI/ML module 107 may be implemented on the MS node 102 or on a cloud server (not shown). The AI/ML module may use local user inputs data 103 for generating the predictive model(s) 108. The local user inputs data 103 may represent data of local users (e.g., artists) who had requested modeling of controllable heads in the past for the same or a similar character, production, etc. In one embodiment, the MS node 102 may acquire remote users' data 106 from a remote cloud server node(s) 105 belonging to other companies or art development outfits. The data 106 may be also ingested by the AI/ML module 107 for training and generation of accurate predictive model(s) 108 of controllable heads.

In one embodiment, the AI/ML module 107 may receive additional data and data from the MS node 102. This data may be used for generation of the controllable heads' parameters. In one embodiment, the controllable head model may be automatically generated and sent to the user data node 101. Other functionalities of the MS node 102 and the AI/ML module are discussed in more detail below.

Figure 1B:
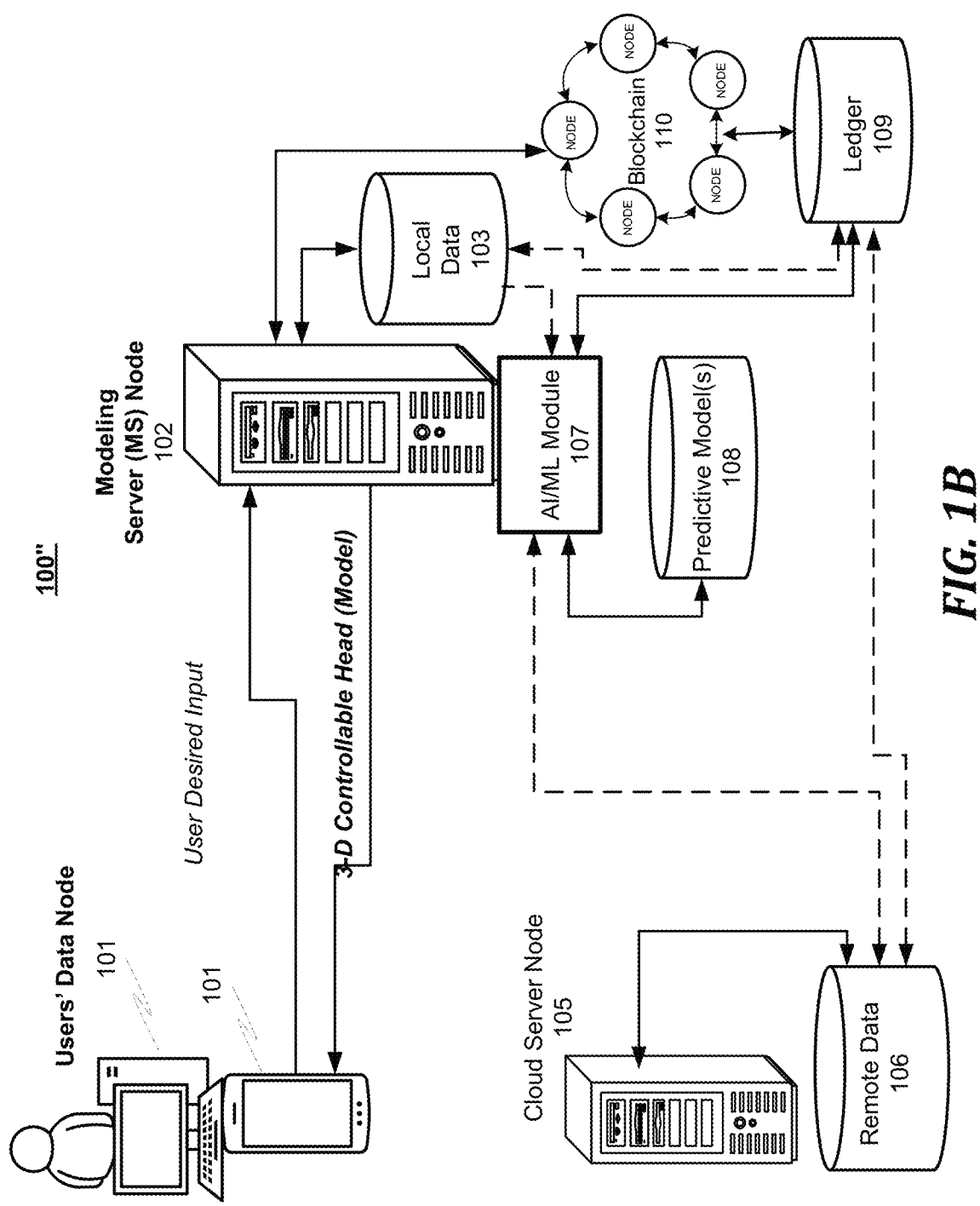
FIG. 1B illustrates a network diagram of an automated system for an AI/ML-based 3-D modeling of unique controllable heads including blockchain consistent with the present disclosure.

FIG. 1B illustrates a network diagram 100" of an automated system for an AI/ML-based 3-D modeling of unique controllable heads including a blockchain consistent with the present disclosure.

As discussed above with respect to FIG. 1A, the MS node 102 may provide the user desired input data to the AI/ML module 107 that may generate predictive model(s) 108 of the controllable 3-D head based on the desired input data parameters. The AI/ML module 107 may be implemented on the MS node 102 or on a cloud server (not shown). The AI/ML module may use local users' (e.g., artists) data 103 for generating the predictive model(s) 108. The local data 103 may represent data of artists who had used the system in the past for the same character head generation or for a design outfit, etc. In one embodiment, the MS node 102 may acquire remote users' data 106 from a remote cloud server node(s) 105 belonging to other companies or design outfits. This data may be also ingested by the AI/ML module 107 for training and generation of accurate predictive model(s) 108. The MS node 102, remote server node(s) 105 and the user data nodes 101 may serve as peers of a blockchain 110 network. In one embodiment, the user data node(s) 101 may be onboarded the blockchain 110 prior to the modeling process. This may, advantageously, provide for a desired level of confidentiality and anonymity for the users if needed (for example, in cases involving investigative or police work).

The user data nodes may provide a blockchain consensus for the final model of the controllable head. Data 103 and 106 may be recorded on a ledger 109 of the blockchain 110 for training the AI/ML module 107 as discussed in detail below with reference to FIG. 4. In one embodiment, the head design may be recorded on the blockchain 110 as an NFT along with the corresponding user desired input data for future training and for audit purposes. In one embodiment, the 3-D head NFT may be automatically generated and sent to the user data node 101 based on the blockchain consensus.

Figure 2:
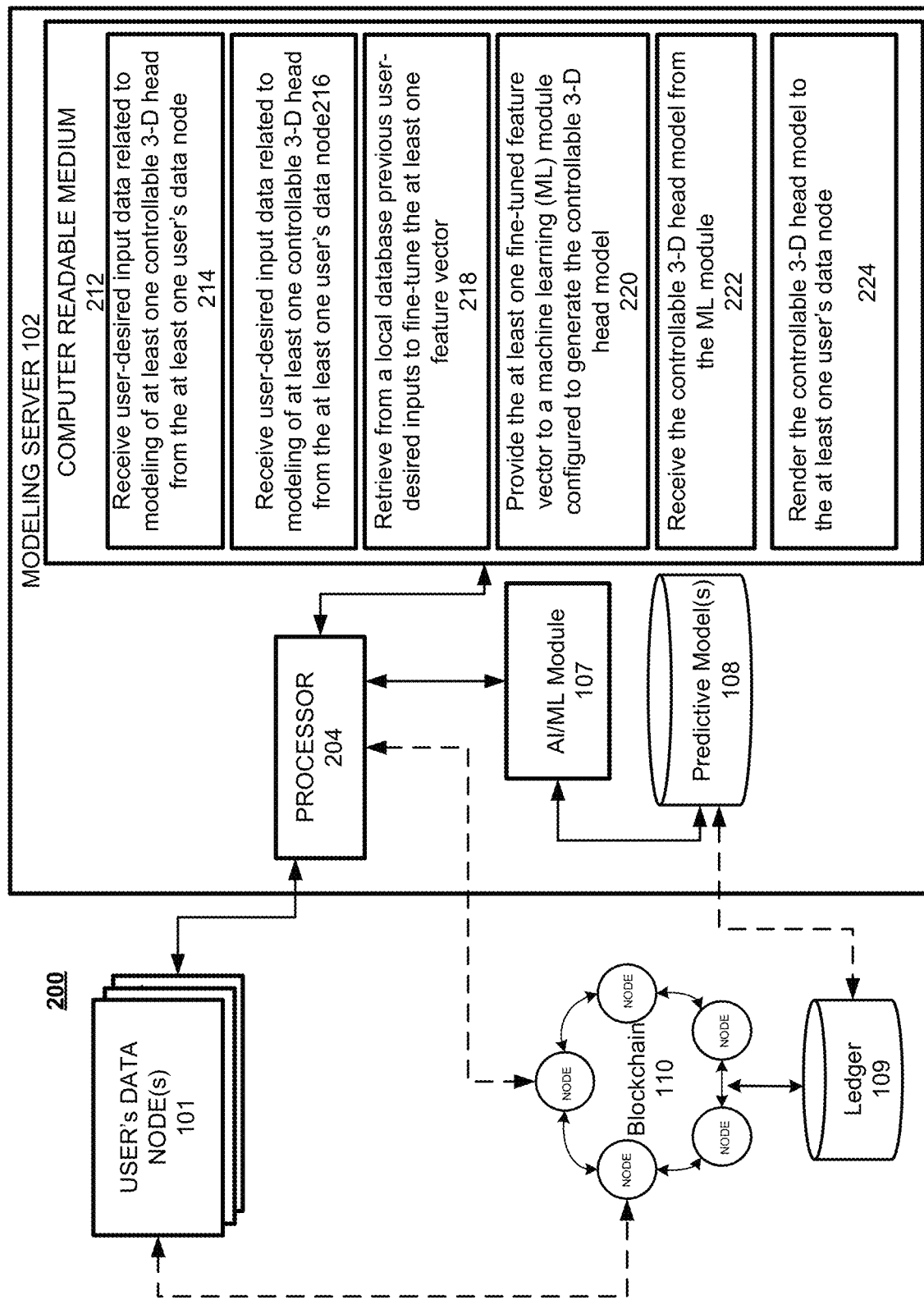
FIG. 2 illustrates a network diagram of a system including detailed features of a modeling node consistent with the present disclosure.

FIG. 2 illustrates a network diagram 200 of a system including detailed features of a modeling server (MS) node consistent with the present disclosure.

Referring to FIG. 2, the example network 200 includes the MS node 102 connected to user's data node(s) 101 over a network. In one embodiment, the MS node 102 may be connected to the user's data node(s) 101 over a blockchain 110 network. The MS node 102 and the user's data node(s) 101 may serve as blockchain 110 peers. Multiple other participant nodes (not shown) may be connected to the MS node 102. The MS node 102 may host or be operatively connected to an AI/ML module 107 configured to generated predictive models 108 based on data inputs received from the MS node 102. The AI/ML module 107 may run on a separate node (or on a cloud) or may be implemented on the MS node 102 as shown in FIG. 2 and may be executed by the processor 204 of the MS node 102. The AI/ML module 107 may have access to a ledger 109 of the blockchain 110 for retrieval or storage of historical user's desired inputs data and previous 3-D models-related data that may be used as training data sets. The AI/ML module 107 may also use the data retrieved from the ledger 109 for generation of the predictive models 108 and for producing recommendations related to 3-D head models provided by the MS node 102.

While this example describes in detail only one the MS node 102, multiple such nodes may be connected to the blockchain 110 network. It should be understood that the MS node 102 may include additional components and that some of the components described herein may be removed and/or modified without departing from a scope of the MS node 102 disclosed herein. The MS node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the MS node 102 may include multiple processors, multiple cores, or the like, without departing from the scope of the MS node 102 system.

The MS node 102 may also include a non-transitory computer readable medium 212 that may have stored thereon machine-readable instructions executable by the processor 204. Examples of the machine-readable instructions are shown as 214-224 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to receive user-desired input data related to modeling of at least one controllable 3-D head from the at least one user's data node 101. The processor 204 may fetch, decode, and execute the machine-readable instructions 216 to parse the user-desired input data to derive at least one feature vector comprising 3-D head modeling parameters. The processor 204 may fetch, decode, and execute the machine-readable instructions 218 to retrieve from a local database 103 previous user-desired inputs to fine-tune the at least one feature vector.

The processor 204 may fetch, decode, and execute the machine-readable instructions 220 to provide the at least one fine-tuned feature vector to a machine learning (ML) module 107 configured to generate the controllable 3-D head model. The processor 204 may fetch, decode, and execute the machine-readable instructions 222 to receive the controllable 3-D head model from the ML module 107. The processor 204 may fetch, decode, and execute the machine-readable instructions 224 to render the controllable 3-D head model to the at least one user's data node. The blockchain 110 may be configured to use one or more smart contracts that manage transactions for multiple participating nodes (e.g., 101, 102 and 105, etc.).

Figure 3A:
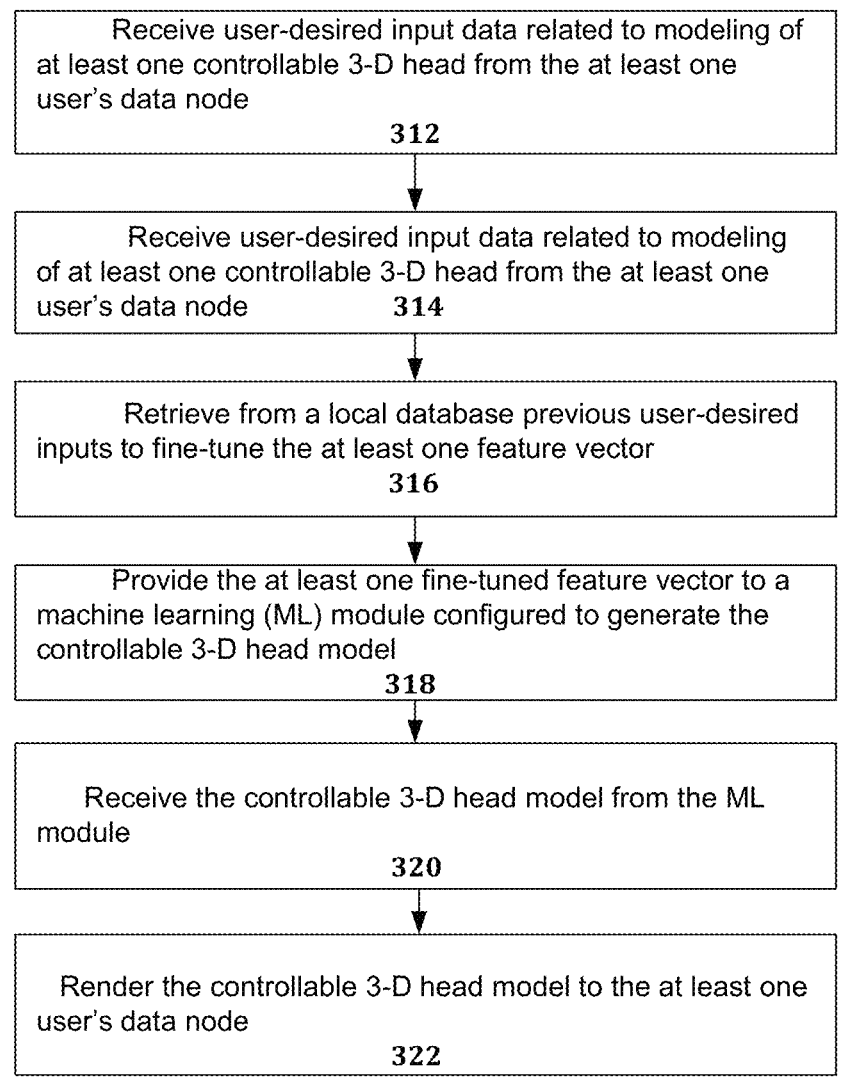
FIG. 3A illustrates a flow chart of a method for ML/AI-based 3-D modeling of unique controllable heads consistent with the present disclosure.

FIG. 3A illustrates a flow chart of a method for ML/AI-based 3-D modeling of unique controllable heads consistent with the present disclosure.

Referring to FIG. 3A, the method 300 may include one or more of the steps described below. FIG. 3A illustrates a flow chart of an example method executed by the MS node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the MS node 102 may execute some or all of the operations included in the method 300.

With reference to FIG. 3A, at block 312, the processor 204 may receive user-desired input data related to modeling of at least one controllable 3-D head from the at least one user's data node. At block 314, the processor 204 may parse the user-desired input data to derive at least one feature vector comprising 3-D head modeling parameters. At block 316, the processor 204 may retrieve from a local database previous user-desired inputs to fine-tune the at least one feature vector. At block 318, the processor 204 may provide the at least one fine-tuned feature vector to a machine learning (ML) module configured to generate the controllable 3-D head model. At block 320, the processor 204 may receive the 3-D head model from the ML module. At block 322, the processor 204 may render the controllable 3-D head model to the at least one user's data node.

Figure 3B:
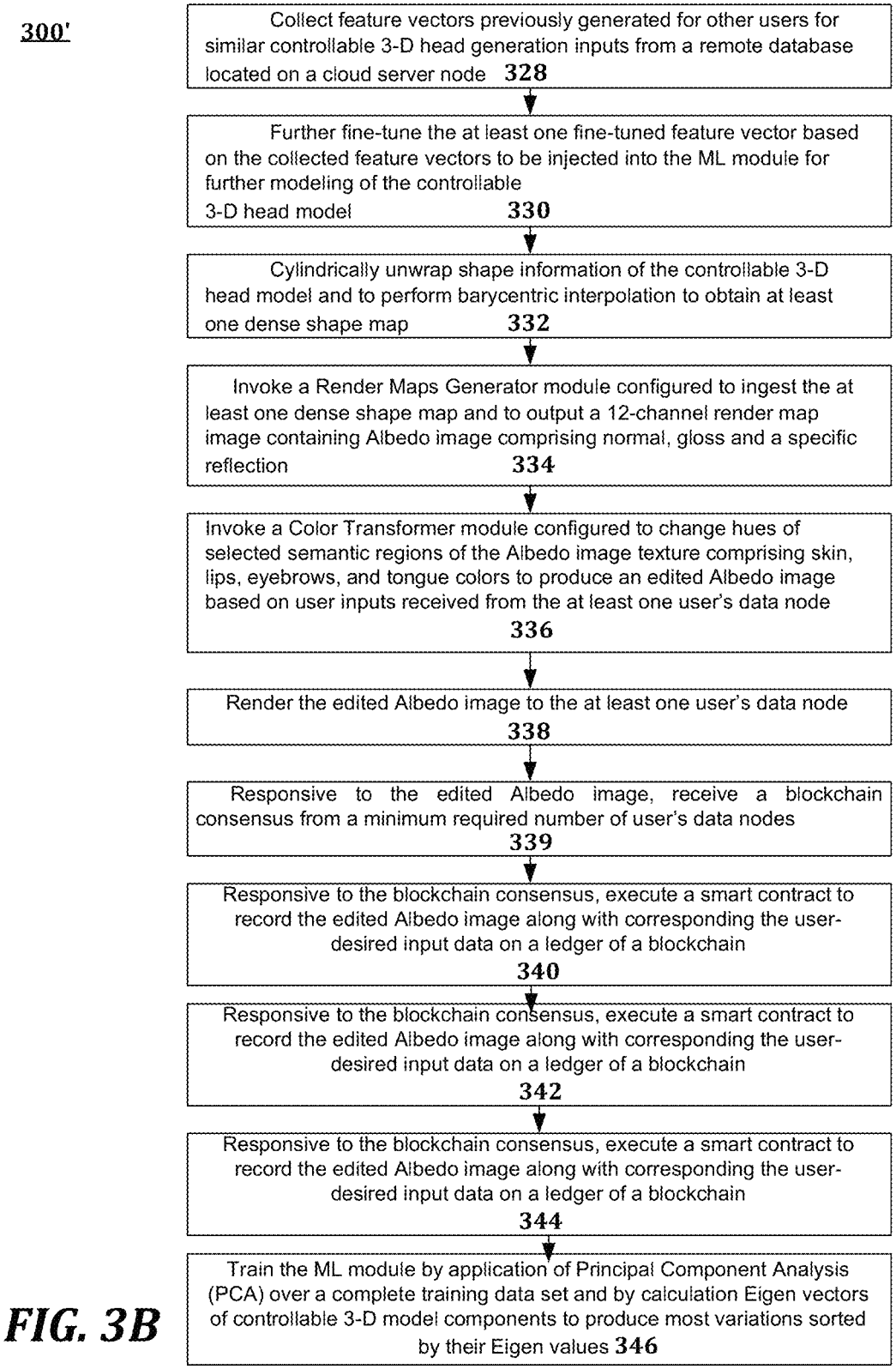
FIG. 3B illustrates a further flow chart of a method for ML/AI-based modeling of unique controllable heads consistent with the present disclosure.

FIG. 3B illustrates a further flow chart of a method consistent with the present disclosure.

Referring to FIG. 3B, the method 300' may include one or more of the steps described below.

FIG. 3B illustrates a flow chart of an example method executed by the MS node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the MS node 102 may execute some or all of the operations included in the method 300'.

With reference to FIG. 3B, at block 328, the processor 204 may collect feature vectors previously generated for other users for similar controllable 3-D head generation inputs from a remote database located on a cloud server node. At block 330, the processor 204 may further fine-tune the at least one fine-tuned feature vector based on the collected feature vectors to be injected into the ML module for further modeling of the controllable 3-D head model. At block 332, the processor 204 may cylindrically unwrap shape information of the controllable 3-D head model and to perform barycentric interpolation to obtain at least one dense shape map. At block 334, the processor 204 may invoke a Render Maps Generator module configured to ingest the at least one dense shape map and to output a 12-channel render map image containing Albedo image comprising normal, gloss and a specific reflection. At block 336, the processor 204 may invoke a Color Transformer module configured to change hues of selected semantic regions of the Albedo image texture comprising skin, lips, eyebrows, and tongue colors to produce an edited Albedo image based on user inputs received from the at least one user's data node.

At block 338, the processor 204 may render the edited Albedo image to the at least one user's data node. At block 339, the processor 204 may, responsive to the edited Albedo image, receive a blockchain consensus from a minimum required number of user's data nodes. At block 340, the processor 204 may, responsive to the blockchain consensus, execute a smart contract to record the edited Albedo image along with corresponding the user-desired input data on a ledger of a blockchain. Note that the edited Albedo image may be recorded as NFT on the ledger 109 of the blockchain 110 (see FIG. 1B). At block 342, the processor 204 may train the ML module by application of Principal Component Analysis (PCA) over a complete training data set and by calculation Eigen vectors of controllable 3-D model components to produce most variations sorted by their Eigen values. The processor 204 may also calculate a plurality of offset values for the user-desired input data comprising age, gender and race.

Figure 4:
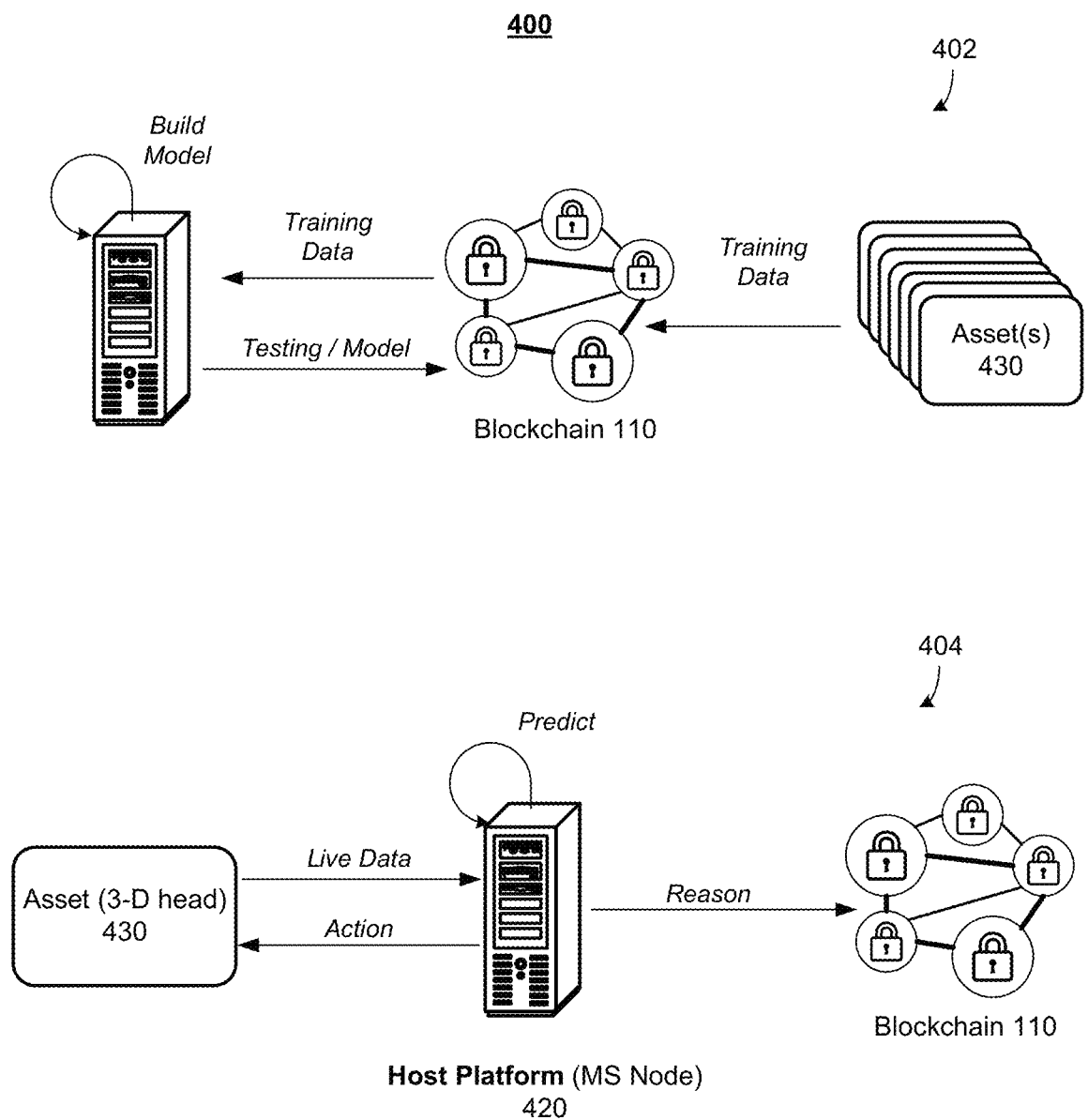
FIG. 4 illustrates deployment of a machine learning model for prediction of heads' modeling parameters using blockchain assets consistent with the present disclosure.

FIG. 4 illustrates deployment of a machine learning model for prediction of heads' modeling parameters using blockchain assets consistent with the present disclosure. In one disclosed embodiment, the controllable head recommendation parameters or model may be generated by the AI/ML module 107 that may use training data sets to improve accuracy of the prediction of the recommendation modeling parameters for the MS node 102 (see FIGS. 1A and 1B). The modeling parameters used in training data sets may be stored in a centralized local database (such as one used for storing local user data 103 depicted in FIGS. 1A-1B). In one embodiment, a neural network may be used in the AI/ML module 107 for heads' modeling and updating modeling/design recommendations.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 101, 102 and 105 (FIG. 1B) may execute a consensus protocol to validate blockchain storage transactions, group the storage transactions into blocks, and build a hash chain over the blocks.

This process forms the ledger by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing head modeling recommendation parameters for efficient application of user desired inputs, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

In the example depicted in FIG. 4, a host platform 420 (such as the MS node 102) builds and deploys a machine learning model for predictive monitoring of assets 430. Here, the host platform 420 may be a cloud platform, an industrial server, a web server, a personal computer, a user device, and the like. Assets 430 can represent heads' modeling parameters. The blockchain 110 can be used to significantly improve both a training process 402 of the machine learning model and the modeling parameters' predictive process 405 based on a trained machine learning model. For example, in 402, rather than requiring a data scientist/engineer or other user to collect the data, historical data (heuristics—i.e., previous artist requests-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the user's data node 101 or from the remote server node 105) to the blockchain 110. By using the blockchain 110 to ensure the security and ownership of the collected data, smart contracts may directly send the data from the assets to the entities that use the data for building a machine learning model. This allows for sharing of data among the assets 430. The collected data may be stored in the blockchain 110 based on a consensus mechanism. The consensus mechanism pulls in (permissioned nodes such as nodes 102, 101 and 105) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 110 by the host platform 420. Each refinement of the machine learning model (e.g., changes in variables, weights, etc.) may be stored on the blockchain 110. This provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make optimal heads' modeling recommendations/predictions based on the execution of the final trained machine learning model using the user's desired parameters. In this example, data fed back from the asset 430 may be input into the machine learning model and may be used to make event predictions such as most optimal head modeling parameters for generation of the controllable head model for the user. Determinations made by the execution of the machine learning model (e.g., head modeling parameters, etc.) at the host platform 420 may be stored on the blockchain 110 to provide auditable/verifiable proof. As one non-limiting example, the machine learning model may predict a future change of a part of the asset 430 (the head modeling parameters). The data behind this decision may be stored by the host platform 420 on the blockchain 110.

As discussed above, in one embodiment, the features and/or the actions described and/or depicted herein can occur on or with respect to the blockchain 110. The above embodiments of the present disclosure may be implemented in hardware, in a computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
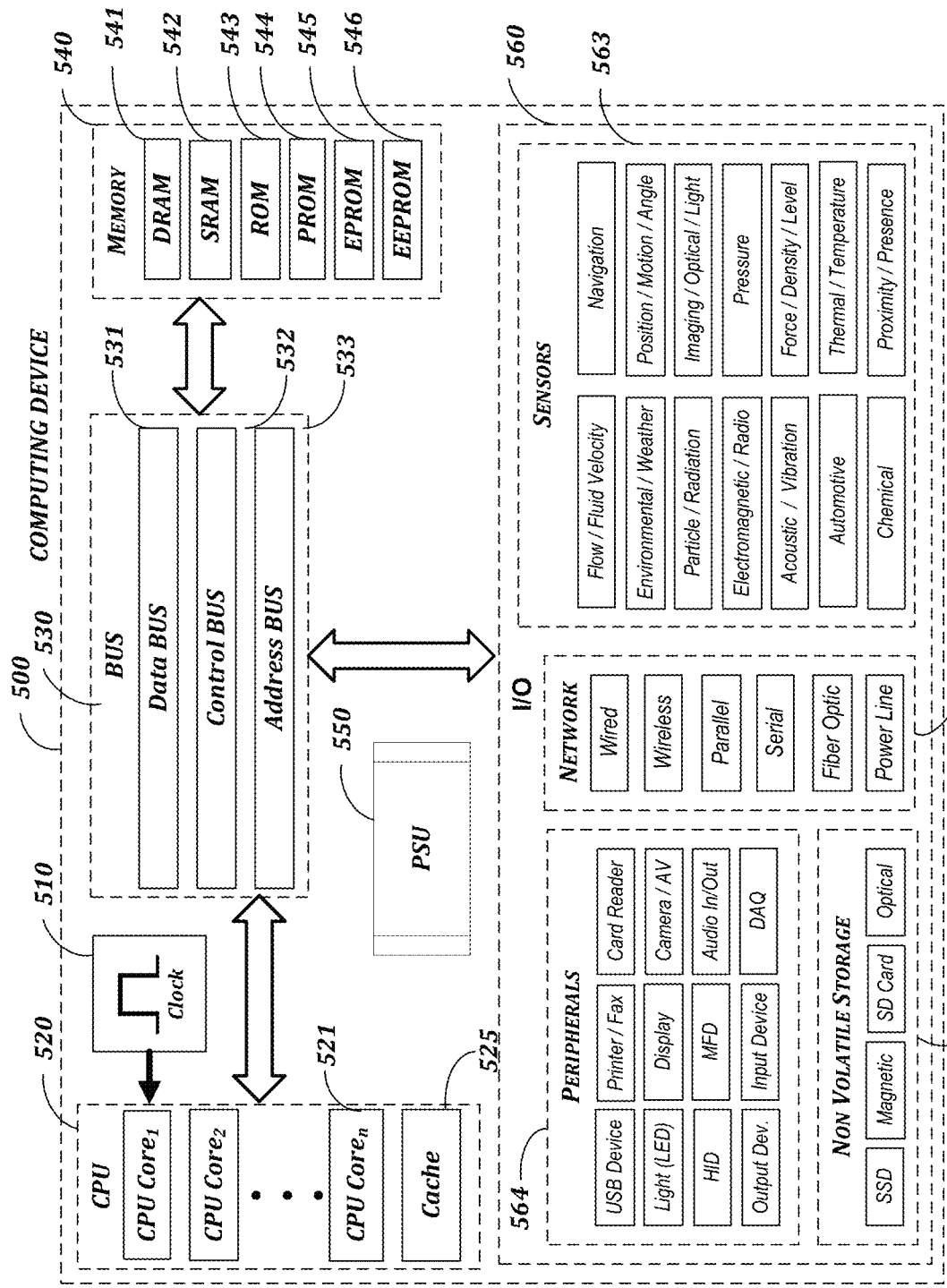
FIG. 5 illustrates a block diagram of a system including a computing device for performing the method of FIGS. 3A and 3B.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The recruitment server 102 (see FIG. 2) may be hosted on a centralized server or on a cloud computing service. Although method 300 has been described to be performed by the recruitment server 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the recruitment server 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

Consistent with an embodiment of the disclosure, the computing device 500 may include the clock module 510 known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where, the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
Express Card
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTraMSport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, know to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3-D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by the at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using intermediate area in the memory 550. The non-volatile storage sub-module 561 does not lose data when power is removed and may be two orders of magnitude less costly than storage used in memory module, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be said are networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:
  Wired communications, such as, but not limited to, coaxial cable, phone lines, twisted pair cables (ethernet), and InfiniBand.
  Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 5G (such as WiMax and LTE), and 5G (short and long wavelength).
  Parallel communications, such as, but not limited to, LPT ports.
  Serial communications, such as, but not limited to, RS-232 and USB.
  Fiber Optic communications, such as, but not limited to, Single-mode optical fiber (SMF) and Multi-mode optical fiber (MMF).
  Power Line communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:
  Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).
  Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.
  Acoustic, sound and vibration sensors, such as, but not limited to, microphone, lace sensor (guitar pickup), seismometer, sound locator, geophone, and hydrophone.
  Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.
  Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.
  Flow and fluid velocity sensors, such as, but not limited to, air flow meter, anemometer, flow sensor, gas meter, mass flow sensor, and water meter.
  Ionizing radiation and particle sensors, such as, but not limited to, cloud chamber, Geiger counter, Geiger- Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensors, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensors, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices uses to put information into and get information out of the computing device 500. There are 3 categories of devices comprising the peripheral sub-module 565, which exist based on their relationship with the computing device 500, input devices, output devices, and input/output devices.

Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3-D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:
- Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).
- Printers, such as, but not limited to, inkjet printers, laser printers, 3-D printers, solid ink printers and plotters.
- Audio and Video (AV) devices, such as, but not limited to, speakers, headphones, amplifiers and lights, which include lamps, strobes, DJ lighting, stage lighting, architectural lighting, special effect lighting, and lasers.
- Other devices such as Digital to Analog Converter (DAC).
- Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system, comprising:
    a processor of a modeling server connected to at least one user's data node over a network; and
    a memory on which are stored machine-readable instructions that when executed by the processor, cause the processor to:
        receive user-desired input data related to modeling of at least one controllable 3-D head from the at least one user's data node;
        parse the user-desired input data to derive at least one feature vector comprising 3-D head modeling parameters;
        retrieve from a local database previous user-desired inputs to fine-tune the at least one feature vector;
        provide the at least one fine-tuned feature vector to a machine learning (ML) module configured to generate the controllable 3-D head model;
        receive the controllable 3-D head model from the ML module; and
        render the controllable 3-D head model to the at least one user's data node;
        cylindrically unwrap shape information of the controllable 3-D head model and to perform barycentric interpolation to obtain at least one dense shape map;
        invoke a Render Maps Generator module configured to ingest the at least one dense shape map and to output a 12-channel render map image containing Albedo image comprising normal, gloss and a specific reflection; and
        invoke a Color Transformer module configured to change hues of selected semantic regions of the Albedo image texture comprising skin, lips, eyebrows, and tongue colors to produce an edited Albedo image based on user inputs received from the at least one user's data node.

2. The system of claim 1, wherein the instructions further cause the processor to collect feature vectors previously generated for other users for similar controllable 3-D head generation inputs from a remote database located on a cloud server node.

3. The system of claim 2, wherein the instructions further cause the processor to further fine-tune the at least one fine-tuned feature vector based on the collected feature vectors to be injected into the ML module for further modeling of the controllable 3-D head model.

4. The system of claim 1, wherein the instructions further cause the processor to render the edited Albedo image to the at least one user's data node.

5. The system of claim 4, wherein the instructions further cause the processor to, responsive to the edited Albedo image, receive a blockchain consensus from a minimum required number of user's data nodes.

6. The system of claim 5, wherein the instructions further cause the processor to, responsive to the blockchain consensus, execute a smart contract to record the edited Albedo image along with corresponding the user-desired input data on a ledger of a blockchain.

7. The system of claim 1, wherein the instructions further cause the processor to train the ML module by application of Principal Component Analysis (PCA) over a complete training data set and by calculation Eigen vectors of controllable 3-D model components to produce most variations sorted by their Eigen values.

8. The system of claim 7, wherein the instructions further cause the processor to calculate a plurality of offset values for the user-desired input data comprising age, gender and race.

9. A method, comprising:
    receiving, by a modeling server (MS) node from an at least one user's data node, user-desired input data related to modeling of at least one controllable 3-D head;
    parsing, by the MS node, the user-desired input data to derive at least one feature vector comprising 3-D head modeling parameters;
    retrieving, by the MS node, from a local database previous user-desired inputs to fine-tune the at least one feature vector;
    providing, by the MS node, the at least one fine-tuned feature vector to a machine learning (ML) module configured to generate the controllable 3-D head model;
    receiving, by the MS node, the controllable 3-D head model from the ML module; and
    rendering the controllable 3-D head model to the at least one user's data node;

cylindrically unwrapping, by the MS node, shape information of the controllable 3-D head model and performing barycentric interpolation to obtain at least one dense shape map;

invoking, by the MS node, a Render Maps Generator module configured to ingest the at least one dense shape map and to output a 12-channel render map image containing Albedo image comprising normal, gloss and a specific reflection; and invoking, by the MS node, a Color Transformer module configured to change hues of selected semantic regions of the Albedo image texture comprising skin, lips, eyebrows, and tongue colors to produce an edited Albedo image based on user inputs received from the at least one user's data node.

10. The method of claim 9 further comprising, collecting feature vectors previously generated for other users for controllable 3-D head generation inputs from a remote database located on a cloud server node.

11. The method of claim 10 comprising, further fine-tuning the at least one fine-tuned feature vector based on the collected feature vectors to be injected into the ML module for further modeling of the controllable 3-D head model.

12. A non-transitory computer readable medium comprising instructions, that when read by a processing component, cause the processing component to perform:

receiving user-desired input data related to modeling of at least one controllable 3-D head;

parsing the user-desired input data to derive at least one feature vector comprising 3-D head modeling parameters;

retrieving from a local database previous user-desired inputs to fine-tune the at least one feature vector;

providing the at least one fine-tuned feature vector to a machine learning (ML) module configured to generate the controllable 3-D head model;

receiving the controllable 3-D head model from the ML module; and rendering the controllable 3-D head model to the at least one user's data node;

cylindrically unwrapping shape information of the controllable 3-D head model and performing barycentric interpolation to obtain at least one dense shape map;

invoking a Render Maps Generator module configured to ingest the at least one dense shape map and to output a 12-channel render map image containing Albedo image comprising normal, gloss and a specific reflection; and invoking a Color Transformer module configured to change hues of selected semantic regions of the Albedo image texture comprising skin, lips, eyebrows, and tongue colors to produce an edited Albedo image based on user inputs received from the at least one user's data node.

13. The non-transitory computer readable medium of claim 12, further comprising instructions, that when read by the processing component, cause the processing component to train the ML module by application of Principal Component Analysis (PCA) over a complete training data set and by calculation Eigen vectors of controllable 3-D model components to produce most variations sorted by their Eigen values.

14. The non-transitory computer readable medium of claim 12, further comprising instructions, that when read by the processing component, cause the processing component to calculate a plurality of offset values for the user-desired input data comprising age, gender and race.

\* \* \* \* \*